United States Patent [19]
Cantoni et al.

[11] Patent Number: 5,146,477
[45] Date of Patent: Sep. 8, 1992

[54] JITTER CONTROL IN DIGITAL COMMUNICATION LINKS

[76] Inventors: Antonio Cantoni, 44 Emmerson Street, North Perth, Western Australia; Zigmantas L. Budrikis, 7 Hotchin Road, Dalkeith, Western Australia; Robert M. Newman, 52 Davallia Road, Duncraig, Western Australia; John L. Hullett, 75 Selby Street, Daglish, Western Australia, all of Australia

[21] Appl. No.: 644,472

[22] Filed: Jan. 18, 1991

Related U.S. Application Data

[63] Continuation of Ser. No. 283,363, Apr. 28, 1989, abandoned.

[30] Foreign Application Priority Data

Mar. 17, 1987 [AU] Australia .................. PI0883

[51] Int. Cl.⁵ ............................................. H04L 7/00
[52] U.S. Cl. .................... 375/112; 375/118; 370/102
[58] Field of Search ............ 375/112, 107, 118, 105.1; 370/102, 108, 105

[56] References Cited

U.S. PATENT DOCUMENTS

| | | | |
|---|---|---|---|
| 3,873,773 | 3/1975 | Guy, Jr. ..................... | 375/112 X |
| 4,017,688 | 4/1977 | Callens et al. ............... | 370/84 |
| 4,095,053 | 6/1978 | Duttweiler et al. .......... | 370/102 |
| 4,347,620 | 8/1982 | Black et al. ................. | 375/112 |
| 4,764,941 | 8/1988 | Choi ........................... | 375/112 |
| 4,768,188 | 8/1988 | Barnhart et al. ............. | 370/80 |
| 4,804,956 | 2/1989 | Boxall ........................ | 370/63 |
| 4,893,306 | 1/1990 | Chao et al. .................. | 370/94.2 |

FOREIGN PATENT DOCUMENTS

3101536 9/1982 Fed. Rep. of Germany .
1155761 1/1969 United Kingdom .

OTHER PUBLICATIONS

Supplemental Search Report, EP Appl. No. 88 90 2774.
WO 86/06899, published Nov. 20, 1986.

*Primary Examiner*—Benedict V. Safourek
*Assistant Examiner*—Tesfaldet Bocure
*Attorney, Agent, or Firm*—Fish & Richardson

[57] ABSTRACT

A method of transmitting digital signals (DI) in frames which include a stuffing field between nodes (N) in a network, each node having a buffer and a local clock for producing local clock signals (CLK2). The method includes the steps of extracting clock signals (CLK1) from the digital signals (DI), writing the digital signals into a buffer at the extracted clock signal (CLK1) rate, reading the digital signals from the buffer including reading the content of the stuffing field in order to add or substrate stuffing bits therein in order to compensate for differences in frequencies between the local and extracted clock signals (CLK1, CLK2), and controlling the adding or subtracting of stuffing bits so that the length of the stuffing field is within predetermined limits.

17 Claims, 5 Drawing Sheets

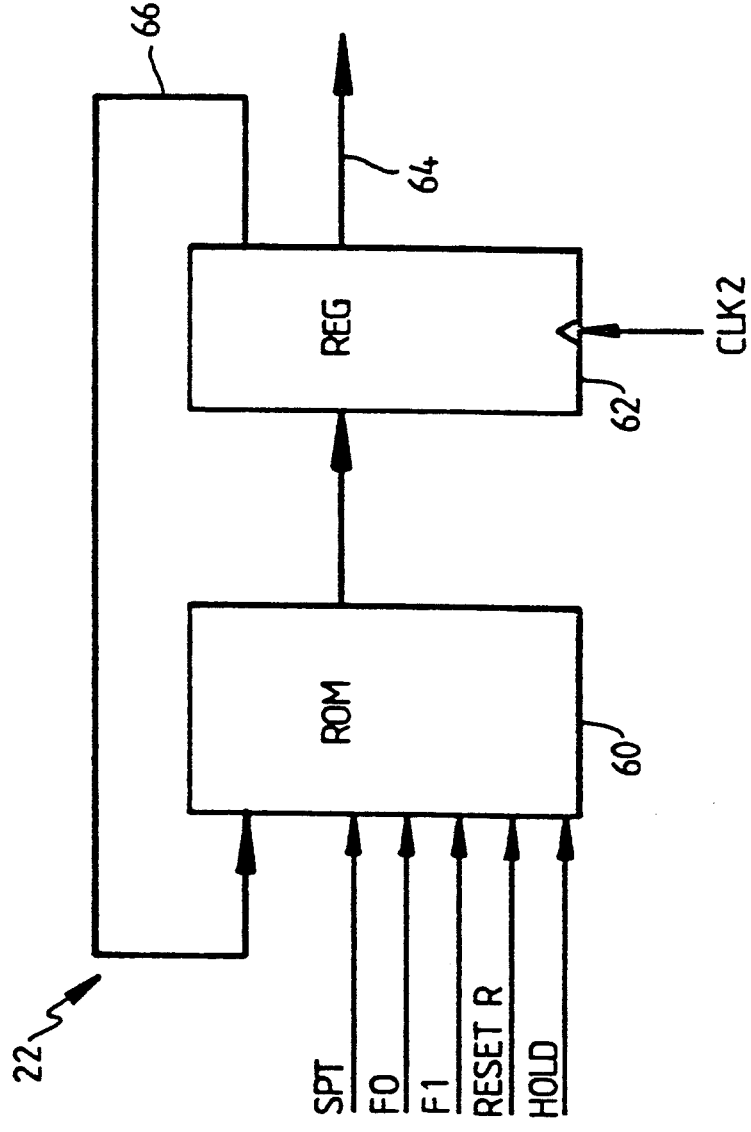
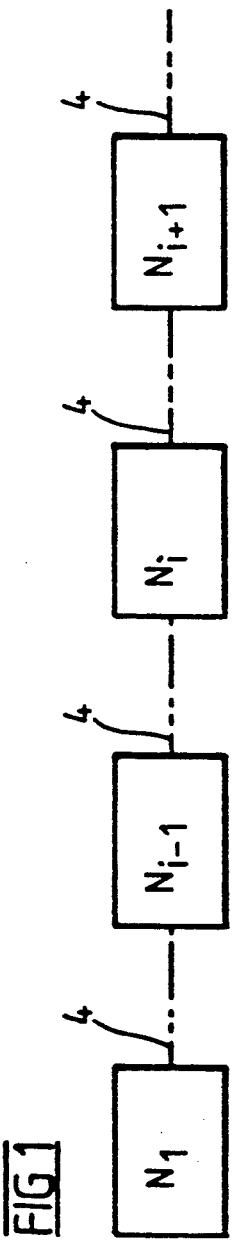
FIG 4
FIG 1

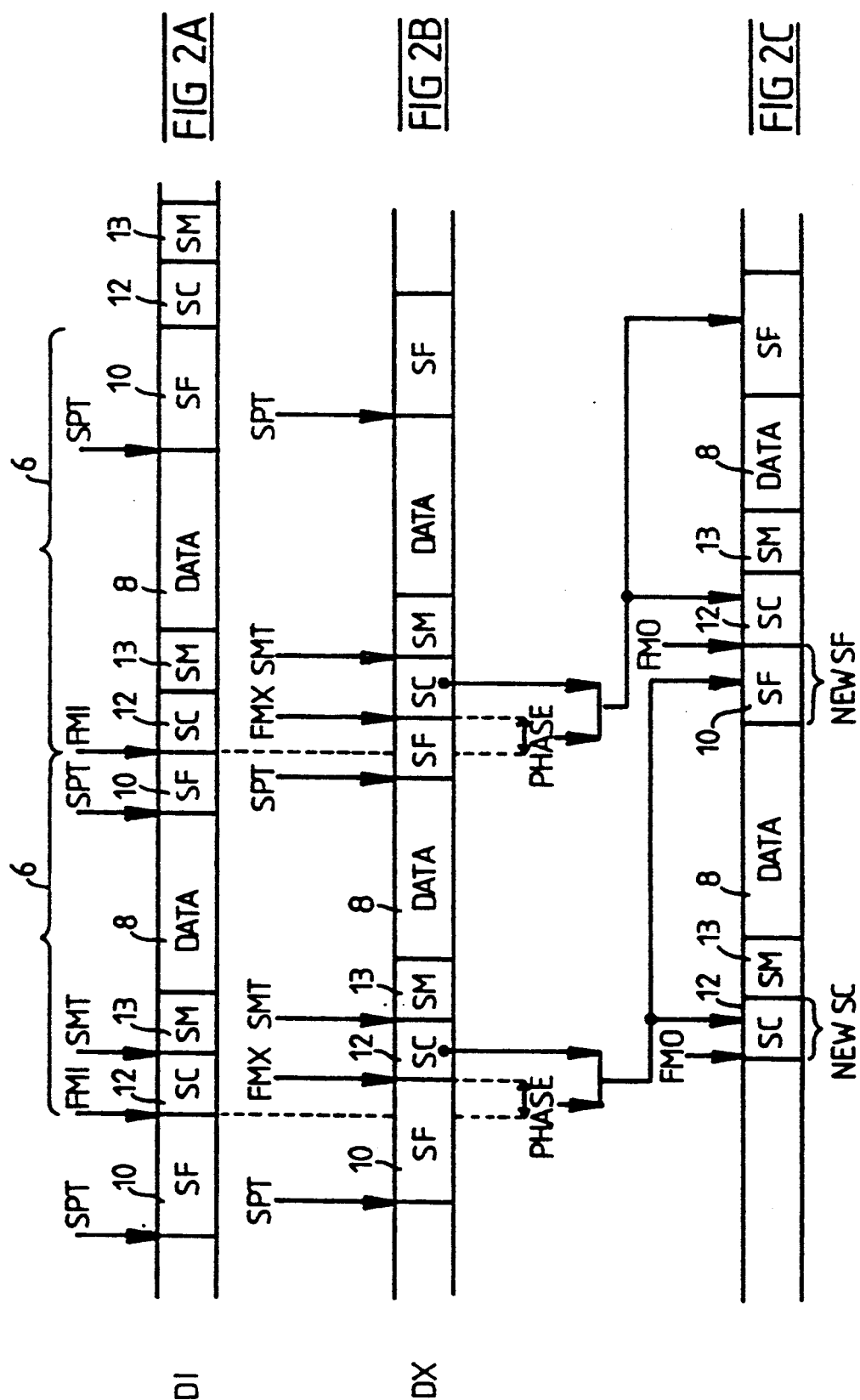

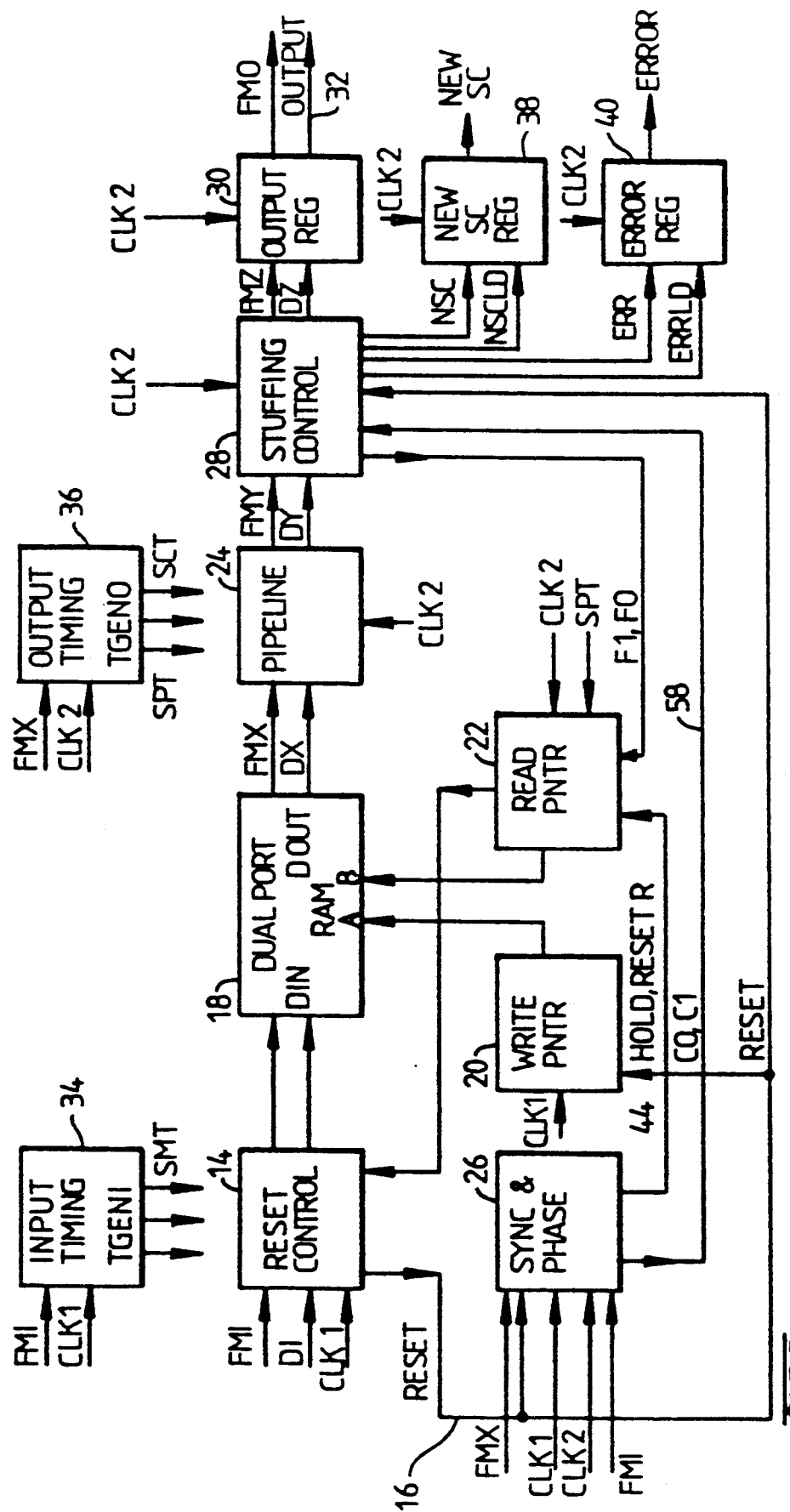

JITTER CONTROL IN DIGITAL COMMUNICATION LINKS

This application is a continuation of application Ser. No. 07/283,363 filed Apr. 28, 1989, now abandoned.

BACKGROUND OF THE INVENTION

This invention relates to jitter control in digital communications links.

More particularly, the invention relates to jitter control in a chain of asynchronous digital communications links.

Communications networks frequently include a chain of nodes N interconnected by links. One such arrangement is disclosed in International Publication No. WO 86/03639. Digital informaton starts at node $N_1$ and is relayed, with or without modification to its content, successively by nodes $N_2$, $N_3$, . . . . In the case of the three typical adjacent nodes $N_{i-1}$, $N_i$, $N_{i+1}$, information is transmitted at the rate of $f_{i-1}$ bits per second from $N_{i-1}$ to $N_i$, at the rate $f_i$ from $N_i$ to $N_{i+1}$. The rates . . . $f_{i-1}$, $f_i$, $f_{i+1}$ . . . are nominally the same, but are dictated by separate clocks, respectively in nodes $N_{i-1}$, $N_i$, $N_{i+1}$, and therefore differ from each other by unpredictable and varying, even if small amounts.

One known practice to avoid these variations is to operate such a chain synchronously without a local clock wherein the only autonomous clock is in $N_1$ and the clocks in $N_2$, $N_3$, . . . are slaved to it. The slaving is typically done by a technique known as bit clock extraction whereby each node synchronises the rate and phase to the incoming bit stream. It then uses the same clock to form and transmit the outgoing stream. There is an ever increasing difficulty with this approach as the chain is made larger. Clock extraction is subject to a finite amount of jitter in phase and the jitter accumulates from node to node leading to a progressively increasing incidence of bit errors.

The use of independent clocks in the nodes is another known technique for overcoming the phase jitter problem. An extracted clock is still used on the receiving side of the node, but the transmission is by an independent clock and therefore not affected by the jitter in the reception. Such an arrangement is made possible by making all transmissions at a higher rate than would be necessary to transmit the actual data and by adding stuffing bits into the stream. The number of stuffing bits over a fixed interval of time can vary from link to link, the differences compensating for the differences in clock rates. By deletion or insertion of stuffing bits or groups of bits, the elastic buffers are not allowed to overflow or go empty.

The digital information is generally formatted, and generally into frames of fixed numbers of bits, the frames recurring at nominally fixed intervals. To allow for stuffing, the format must provide space for stuffing bits. Typically this can be the residual time interval between the end of data of one frame and the beginning of the next frame. Since the number of stuffing bits is variable, there is the further requirement that there be a definite indication of the start of the frame.

SUMMARY OF THE INVENTION

Generally speaking, the object of the present invention is to overome drawbacks in the known techniques.

One problem is in the size of fluctuation of the stuffing space in any frame and hence time jitter in the occurrence of the frame marker at all nodes of the chain. The existing practice is that stuffing bits are deleted or inserted by a node on the sole indication provided by the state of fill in the elastic buffer in that node. While this functions quite well most of the time and on average gives satisfactory performance, in a system with a large number of nodes it is subject to occassional large variations in the number of stuffing bits in individual frames. Moreover the size of the possible fluctuation grows linearly with the number of nodes. In accordance with one aspect of the invention the size of the possible fluctuation is held to a designated maximum independently of the number of nodes.

According to a first aspect of the invention, a method of transmitting digital signals in frames which include a stuffing field between nodes in a network, each node having a buffer and a local clock for producing local clock signals, said method including the steps of extracting extracted clock signals from the digital signals, writing said signal into a buffer at the extracted clock signal rate, reading said signals from the buffer including reading the content of the stuffing field in order to add or subtract bits therein in order to compensate for differences in frequencies between said local and extracted clock signals, and controlling said adding or subtracting of bits so that the length of the stuffing field is within predetermined limits.

The invention also provides an apparatus for transmitting digital signal frames which include a stuffing field between nodes in a network said apparatus comprising:

means for extracting first clock signals from said digital signals, a local clock for generating second clock signals, a buffer into which said signals are written at the first clock rate, reading means for reading signals in the buffer including the content of the stuffing field, stuffing means for adding or subtracting bits in the stuffing field of a frame to compensate for differences in frequencies between the first and second clock signals, and stuffing control means for controlling said stuffing means so that the length of the stuffing field is within predetermined limits.

If the stuffing field is permitted to become too small and attempted deletion therefrom could result in deletion of data. If the stuffing field becomes too big it can result in very long signal frames which may not be able to be handled by some circuitry coupled to the network.

Another problem in the existing practice is that the transmission over the links must conform to the format of the data and include frame marker and stuffing bits. In common practice that is provided by a line code, whereby the data stream is encoded into a link bit stream of appropriately higher rate. Typically blocks of four data bits are encoded into blocks of five bits on the link. Some specific five bit combination, not expressing data, can serve as a frame start indicator, while other such unused combinations can be used for stuffing. A four bit/five line code, as the above is known, necessitates a link rate that is 20 per cent above the nominal node rate. In accordance with another aspect of the invention, the system utilises link transmissions that have a framing which is independent from that in the data stream and therefore can have the same nominal bit rate as the nodes.

More specifically, a further aspect of the invention provides a digital communications network including a chain of nodes interconnected by links, the network being characterized by the provision of means to establish fixed frames for information to be transmitted, the frames including at least one pointer for indicating the next predictable event in the transmitted data and the nature of the next predictable event. Reference is made to a system know as the SONET system (Synchronous Optical Network, T1X1.4/87-50R4 Draft American National Standard) in which pointers are used to indicate the location of the start of payload envelopes.

DESCRIPTION OF THE PREFERRED EMBODIMENT

Figure 5:
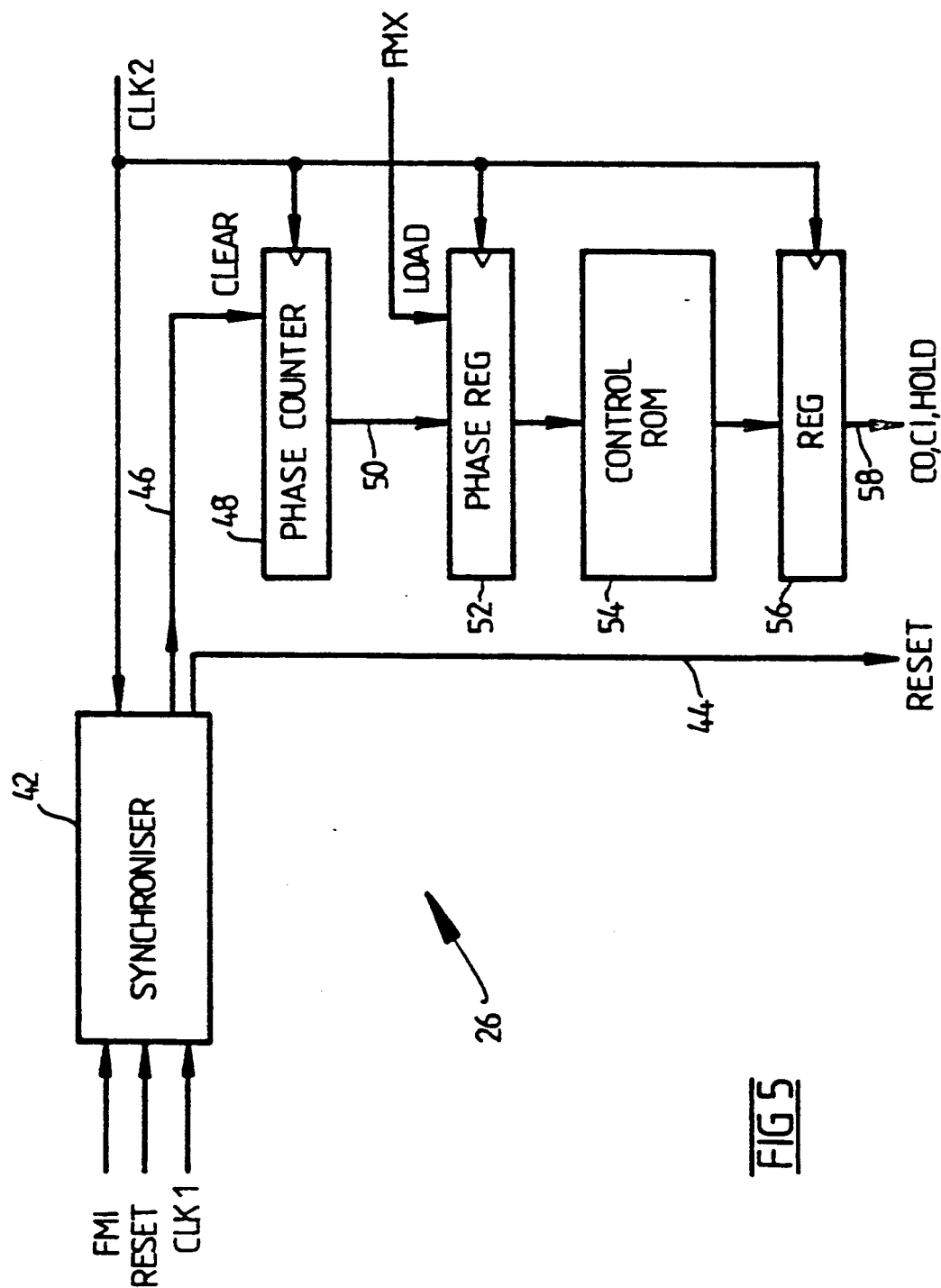
Figure 6:
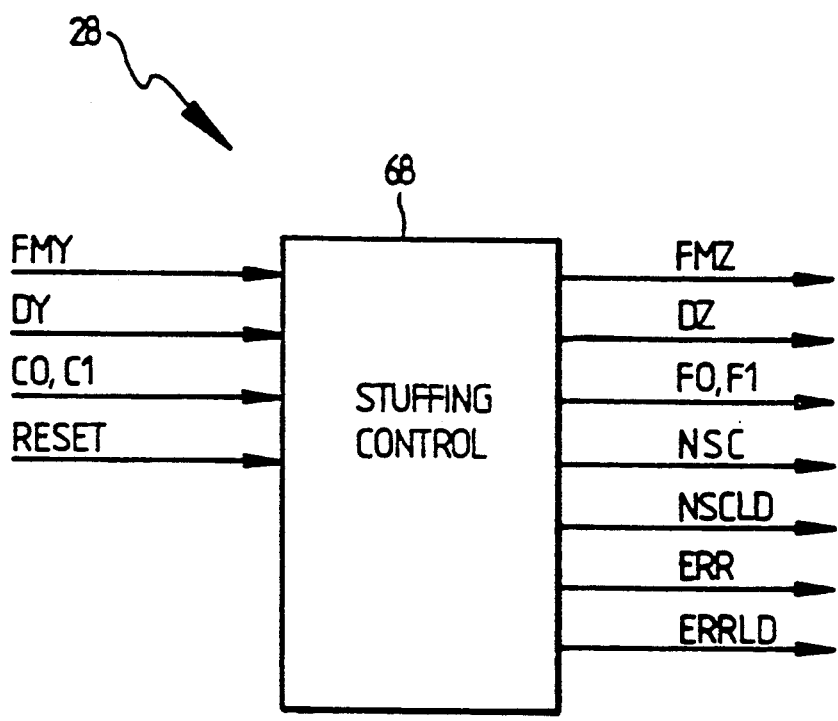

The invention will now be further described with reference to the accompanying drawings in which:

FIG. 1 diagrammatically illustrates a network comprising a chain of nodes and links, FIGS. 2A, 2B and 2C illustrate the format variable data frames on which a constrained stuffing algorithm operates, FIG. 3 is a schematic illustration of an implementation of a constrained stuffing algorithm, FIG. 4 is a block diagram of a read pointer circuit, FIG. 5 is a block diagram of a sync and phase detecting circuit, and FIG. 6 is a block diagram of the stuffing control circuit.

FIG. 1 shows a schematic illustration of part of a network which includes a chain of nodes N interconnected by links 4. The nodes N may for instance comprise access units of the type described in International Publication No. WO 86/03639. Alternatively the nodes could comprise groups of such access units.

Digital information starts at node $N_1$ and is relayed, with or without modification to its content, successively by nodes $N_2$, $N_3$, .... In the case of the three typical adjacent nodes $N_{i-1}$, $N_i$, $N_{i+1}$, information is transmitted at the rate of $f_{i-1}$ bits per second from $N_{i-1}$ to $N_i$, at the rate $f_i$ from $N_i$ to $N_{i+1}$. The rates ... $f_{i-1}$, $f_i$, $f_{i+1}$ ... are nominally the same, but are dictated by separate clocks, respectively in nodes $N_{i-1}$, $N_i$, $N_{i+1}$, and therefore differ from each other by unpredictable and varying, even if small, amounts.

The digital information is formatted into repetitive frames 6 of variable numbers of bits, as shown diagrammatically in FIG. 2. Each frame 6 includes a data field (DATA) 8, a stuffing field (SF) 10 and, in accordance with the invention, a stuffing control (SC) field 12. Each frame preferably also includes a stuffing control management field (SM) 13. The field 13 is used at system level, for example, on system start up a command can be sent in the SM field to reset all stuffing control circuits in the system, as will be described later. In a typical arrangement, an extracted clock is used on the receiving side of a node but transmission from the node is effected using an independent clock which is not effected by jitter in the reception at the node. Such an arrangement is made possible by making all transmissions at a rate higher than would be necessary to transmit the actual data and by adding stuffing bits in the stuffing field 10. In known arrangements, the number of stuffing bits in the stuffing field 10 over a fixed interval of time can vary from link to link, the differences compensating for differences in clock rates. These variations can be effected in association with elastic buffers in the nodes which are replenished by the incoming clock and emptied by the outgoing clock. By deletion or insertion of stuffing bits in the field 10, the elastic buffers are not allowed to overflow or go empty.

The stuffing field control bits in the SC field 12 are used as indications to nodes as to what alterations to the size of the stuffing fields 10 in the given frame have already been made by preceding nodes.

This information is used by the node to decide whether an alteration to the stuffing field 10 contemplated by it is permissible. Should the alteration take the total stuffing field beyond the allowed limit—either too large or too small—then the node will defer until the next frame or later. Holding up such alteration will be at the expense of making the elastic buffer at the node to depart in its fill from the designed median level. However it is feasible to make the tolerance on clock rates sufficiently tight and the range of allowed buffer fill levels sufficiently broad that deferrals up to several frame periods will not precipitate any exceptional behaviour.

This technique enforces hard limits on the size of the stuffing field 10 in any frame 6, irrespective of the size of the chain. In that sense chains can be made of arbitrarily large size and still maintain the one size of stuffing field. However the technique amounts to a restriction on promptness of control action at the nodes and this is more marked by its effect, the further the node is along the chain away from $N_1$.

The larger the number of nodes, the tighter must be the tolerance on node clock rates, or the larger the elastic buffers at the nodes, or both in combination, but these are considerably smaller increases in requirements on clock tolerance and buffer size than prevail without the jitter control of the present invention.

There are many options for the indication of stuffing that is passed from node to node in the SC field 12. The simplest would be a one-bit signal indicating that a change in stuffing had already been made, without indicating whether the change was positive or negative. Subsequent nodes would be inhibited from making any change. This simple arrangement of the present invention is workable. A better indication would be a two-bit signal which would indicate whether the stuffing is at design level, or is larger or smaller by one stuffing bit than the design level. A node could alter the stuffing field if it wanted to reduce it and it was at design level or one bit above or if it wanted to increase it and it was at design level or one bit below it. A still better indication is the actual size of the stuffing field. With this it is possible to institute allowed departures of arbitrary size.

There are also different possibilites where in the frame the indication of stuffing is placed. It could be before the data, or imbedded in the data or at the end of the data. The most effective place for it is immediately after the data field 8, i.e. at the end of the frame 6 as shown in FIG. 2.

FIG. 3 is a block diagram of one possible implementation of the constrained stuffing algorithm of the invention. In this circuit, a clock signal CLK1 is recovered from the incoming data stream (DI) by known techniques. The clock signal CLK1 is desirably at exactly the same frequency of a local clock signal CLK2 which is generated by an ocsillator (not shown) at the node. In accordance with the techniques of the invention, the stuffing algorithm is arranged to compensate for the frequency difference the clock signals CLK1 and CLK2.

Data DI from the network is inputted to a reset control circuit 14 which is clocked by the clock CLK1. The reset control circuit 14 receives an input signal FMI which indicates the incoming frame marker.

FIG. 2A illustrates the incoming data stream DI and shows the incoming frame marker FMI at the head of the stuffing control field 12. The diagram also shows a stuffing management time SMT indicator at the start of the SM field 13. The diagram also shows an SPT indicator at the start of the SF field 10. The indicators SFI, SMT and SPT are all in synchronism with the clock CLK1 derived from the incoming data DI. Generally speaking, the reset control circuit 14 generates reset signals on output line 16 for resetting other parts of the circuitry, as will be described herein. The data stream from the reset control 14 passes to the input of a dual port RAM 18 which, together with write pointer 20 and read pointer 22, function as an elastic buffer for delaying the data stream by an amount which depends upon the stuffing control algorithm. The dual port RAM 18 is arranged to function as a FIFO memory, for instance of the type described in Texas Instruments Data Manuals.

The delayed output data stream DX from the dual port RAM is illustrated in FIG. 2B. In this diagram, the delayed frame marker is denoted as FMX. The data stream DX is coupled to the input of a pipeline circuit 24 which is clocked by the local clock CLK2. The pipeline circuit 24 comprises a register which is capable of holding 5 octets of the data stream. It functions as a delay circuit in order for phase measurements to be made in a sync and phase circuit 26. Output from the pipeline circuit 24, denoted as data stream DY, is coupled to a stuffing control circuit 28 which is also clocked by the local clock CLK2. The output data stream DZ from the circuit 28 is connected to an output register 30 which again is clocked by the local clock CLK2. The output data stream on output line 32 is shown in FIG. 2C. The output frame marker FMO in this data stream indicates the start of the stuffing control field 12.

The circuit includes an input timing generator 34 which is synchronised to the incoming frame marker FMI and clocked by CLK1. The generator 34 produces at its output the SMT indicator which identifies the octet in the frame which constitutes the SM field 13 and contains the stuffing management code. The stuffing management code may include the ability to reset the stuffing control system for instance on system start-up.

The circuit also includes an output timing generator 36 which is synchronised to the frame marker FMX at the output of the RAM 18 and is clocked by the local clock CLK2. The generator 36 generates two timing signals which are: (i) a stuffing control time SCT to identify the SC field 12 (which in the illustrated arrangement is the same as the FMI indicator) and (ii) a stuffing pad time SPT which identifies the first octet of the stuffing field 10.

The circuit includes a new SC register 38 which holds the new value for the code in the stuffing control field 12, generated by the stuffing control circuit 28. The circuit includes an error register 40 which receives error signals from the control circuit 28. The register 40 is used as an optional monitoring device to enable monitoring of the number of errors which occur in the stuffing control which for instance may be signalled when the incoming frame has too much stuffing or the incoming frame has insufficient stuffing.

Generally speaking, the circuit functions as follows: the sync and phase circuit 26 measures the phase difference between the FMI and FMX indicators. If the measured phase is equal to D, the desired phase difference, in octets, then no stuffing action is required. For instance, if the clock CLK2 is slower than the clock CLK1, the measured phase will be greater than the desired phase D. In that event, the read pointer 22, which is clocked by the clock CLK2, would tend to fall behind the write pointer 20 which is clocked by the clock CLK1 and this would eventually lead to errors. To avoid errors, one octet of the stuffing control field 10 is skipped by the read pointer 22 so as to give the read pointer 22 a period of one octet in which to catch up. This effectively obviates problems caused by differences in frequencies between the clocks CLK1 and CLK2. If however the incoming data stream DI has been subjected to stuffing upstream, as indicated by the content of the stuffing control field 12, further stuffing action at the node would result in either too much or too little stuffing, then no further stuffing is possible and an error is recorded in the register 40. If the clock CLK2 is faster than the clock CLK1, stuffing bits need to be added, subject to the aforementioned limits.

Thus, in the technique of the invention, the length of the stuffing field 10 within a frame remains in selectable limits independently of the number of cascaded nodes. The method of control uses not only the state of fill of the dual port RAM 18 but also the amount of stuffing already present in the incoming data stream DI as a result of stuffing actions carried out by previous nodes. A node is permitted to delete to add stuffing bits in the stuffing field SF of a frame if and only if the new stuffing field lies within the selected limits. For instance, the nominal length of the stuffing field 10 may be 16 octets and it may be constrained to never be less than 4 octets or greater than 28 octets. At 16 octets, it is at the design level. Given the tolerance on the clocks and the limits on the stuffing field, the size of the RAM 18 can be dimensioned so that overflow and underflow will not occur for a given number of cascaded nodes. In operation, data is written into and read out of the dual port RAM 18 and the phase difference measured by the circuit 26 is indicative of how much information is in the RAM 18, at any point of time. This in turn depends on the frequency difference between the clocks CLK1 and CLK2.

The reset control circuit 14 produces reset signals on output line 16 when a stuffing reset request code has been written into the SM field 13. In addition, the reset control circuit 14 can also produce a reset signal when an internal fault is detected. The reset output 16 is coupled directly to the reset input of the write pointer 20 and indirectly to the reset input of the read pointer 22 via the sync and phase circuit 26.

The sync and phase circuit 26 is illustrated in more detail in FIG. 5. It comprises a synchroniser circuit 42 which has FMI, CLK1, CLK2 and reset inputs from the line 16. It has an output line 44 which is coupled to the reset input of the read pointer 22. Its other output 46 is connected to the clear input of a phase counter 48 so as to clear the counter on each frame. The synchroniser circuit 42 generally speaking comprises two cascaded flip flops which produce an output signal on line 46 which is synchronised with the FMI with respect to CLK2. A suitable implementation for this arrangement is described in an article entitled "Metastable Behaviour in Digital Systems" by L. Kleeman and A. C. Cantoni, I.E.E.E. Design and Test of Computers, Volume 4, 6 Dec. 1987, pp 4–19. The phase counter 48 comprises an 8 bit synchronous counter which counts clock pulses from the clock CLK2 and is cleared each frame by output from the synchroniser circuit 42 on line 50. The output of the counter represents the running count of CLK2 pulses since the last clearing signal generated by the synchroniser circuit 42. The line 50 is connected to the input of a phase register 52 which copies the output of the counter into the register on receipt of an FMX signal coupled to its load input. Thus the value in the register 52 represents the phase difference between FMI and FMX. The output of the phase register 52 is coupled to a control ROM 54 which stores the value D, the desired phase difference in octets between FMI and FMX. The ROM 54 produces two conditional stuffing command signals C1, C0 in accordance with the following table:

|  | C1 | C0 | Stuffing Action (Conditional) |
|---|---|---|---|
| Phase < D | L | L | +1 |
| Phase = D | L | H | 0 |
| Phase > D | H | L | −1 |

The stuffing command signals C1 and C0 are conditional because the stuffing control circuit 28 may find that the incoming frame already has a code in the stuffing control field 12 which is either at the upper or lower limit. When the stuffing control field is at a limit then further stuffing is permissable only if it does not vialate the constraints imposed upon stuffing code, as mentioned previously. The ROM 54 could of course be replaced by comparators and logic gates in order to generate the necessary command signals C1 and C0. Output from the ROM 54 is coupled to an output register 56, the output line 58 of which is connected to an input of stuffing circuit 28.

The read pointer 22 is illustrated in more detail in FIG. 4. This circuit includes a ROM 60 and shift register 62. The ROM 50 has hold and reset inputs from the sync and phase circuit 26, unconditional stuffing command signals F0 and F1 from the stuffing control circuit 28, and the SPT indicator. Output from the ROM 60 (which is 4 bit parallel data) is inputted into the register 62 which is clocked by the local clock CLK2. The output of the register on line 64 is coupled to the B input of the dual port RAM 18. The output is also fed back to an input of the ROM 60 via feedback line 66. The ROM 60 generates a 4 bit address output and information which enables the reset control block 14 to check for pointer wrap-around. The read pointer 22 operates synchronisely the local clock CLK2. The output of the read pointer is set to zero under control of the reset block 14.

The ROM 60 is arranged to produce the following logical functions (assuming RESET and HOLD are inactive):

| SPT | F1 | F0 | New Output | Effect on Stuffing Field |
|---|---|---|---|---|
| H | L | L | old + 0 | +1 |
| H | L | H | old + 1 | 0 |
| H | H | L | old + 2 | −1 |
| H | H | H | old + 1 | 0 |
| L | X | X | old + 1 | USED FOR NORMAL |

-continued

| SPT | F1 | F0 | New Output | Effect on Stuffing Field |
|---|---|---|---|---|
|  |  |  |  | TWO PORT READ |

Note:
(a) In the above, X means don't care.
(b) SPT is generated by output timing circuit 36 to identify the first octet of the stuffing field in the frame.
(c) RESET overides all inputs and causes the output to zero.
(d) if RESET is inactive then HOLD causes the output to remain unchanged.
(e) The New Output indicates the read addresses for the read pointer.
(f) +1 on the stuffing field indicates an increased length of the stuffing field 10 by one octet and −1 decreases length of the stuffing field by one octet.

The stuffing control circuit 28 is illustrated in more detail in FIG. 6. The circuit comprises a ROM 68 which has inputs FMY, DY, conditional stuffing commands C0, C1 from the sync and phase circuit 26 and reset input from the reset control circuit 14. It has an output FMZ to indicate the frame marker position at its output, data stream DZ after stuffing control has taken place, and unconditional stuffing control outputs F0 F1 which are generated by the logic steps in the ROM 68. It also produces the new value NSC for the stuffing control field 12. It produces an NSC load signal NSCLD which is inputted to the load input of the register 38. It also has an error output ERR and an error load signal ERRLD which is connected to the loading input of the error register 40. The stuffing control circuit 28 could of course be implemented by using logic blocks such as gates. It is however most conveniently implemented in the form of the ROM. The table which follows, which is based upon a Pascal language notation, sets out the principal logical steps needed to generate the unconditional stuffing command signals F0 and F1, NSC and ERR signals.

```
[
FMZ:=FMY;
IF FMY=L and RESET=H
THEN   [
            DZ:=DY;
            F0:=H; F1:=H;
            NSC:=0; NSCLD:=L;
            ERR:=0; ERRLD:=L;
       ]
IF FMY=H and RESET=II
THEN   [
            DZ:=sfnominal;
            F0:=H; F1:=H;
            NSC:=DZ; NSCLD:=H;
            ERR:=errorcode1; ERRLD:=H;
       ]
IF FMY=L and RESET=L
THEN   [
            DZ:=DY;
            F0:=H; F1:=H;
            NSC:=o; NSCLD:=L;
            ERR:=o; ERRLD:=L;
       ]
IF FMY=H and RESET=L
THEN   [
            IF DY>SFMAX   (error)
            THEN   [
                        F0:=H;F1:=H;
                        NSC:=DY; NSCLD:=H;
                        ERR:=errorcode2; ERRLD:=H;
                   ]
            IF DY<SFMIN
            THEN   [
                        DZ:=DY;
                        F0:=H;F1:=H;
                        NSC:=DY; NSCLD:=H;
                        ERR:=errorcode3; ERRLD:=H;
                   ]
            IF DY<SFMAX and (C1 equals the complement
of C0)
```

```
            -continued
     THEN   [
            F1:=C1; F0:=C0;
            IF C1=L THEN DZ:=DY ELSE
            DZ:=DY-1;
            NSC:=DZ; NSCLD:=H;
            ERR:=0; ERRLD:=H;
     IF DY>=SFMIN and (C1=L)
     THEN   [
            F1:=C1; F0:=C0;
            IF C0:=H then DZ:=DY ELSE
            DZ:=DY+1;
            NSC:=DZ; NSCLD:=H;
            ERR:=0; ERRLD:=H;
            ]
     ]
]
Errorcode:
errorcode1        Reset to nominal stuffing has occurred
errorcode2        Incoming frame has too much stuffing
errorcode3        Incoming frame has insufficient
                  stuffing
Parameters
SFMAX             Maximum allowable stuffing
SFMIN             Minimum allowable stuffing
SFNOMINAL         Nominal stuffing.
```

In accordance with a second aspect of the invention, when there are no externally imposed constraints, then a natural choice in framing is a fixed number of bits per frame 6. This results in the most effective utilisation of transmission capacity and least complex terminal equipment. Fixed framing is the accepted practice wherever it is possible. There are many instances of existing transmission systems of that type. The present invention makes it possible to use fixed framing on the links, and hence use existing or already developed equipment where the data transmitted has a variable frame.

A variable frame has a nominal number of bits per frame with a positive and negative variation. The frame arrangement to which the first aspect of the invention refers is an instance. That particular case has a fixed number of data bits in the field 8 and a variable number of stuffing bits in the field 10. Another instance would be where the number of data bits and the number of stuffing bits were both variable. (Though not described above, the first aspect of the invention would be workable in the latter case also. The only additional requirement then is only that there be an explicit indication of the end of data as well as that of the start).

The present invention allows the transmission of variable frames over fixed framed transmission links without imposing any delays in the presentation of the variable framed data at the receiving end, other than the actual transmission delay. It predicates explicit indications of predictable events in the variable framed stream to which pointers are imbedded in the fixed frame stream. This is explained most easily using the specific instance of a fixed length data field 8 and followed by a variable length stuffing field 10, the size of the stuffing field being indicated at its start as described previously. This is illustrated in FIG. 2.

The fixed frame 6 will typically consist of a time multiplexed arrangement of frame overhead and transmitted data where the frame overhead is used for supervisory or management communication from transmitter to receiver. It is necessary that there be room in that overhead for pointers just referred to. For the sake of description we assume that exactly one pointer is provided per fixed frame and that it points to the next predictable event (NPE) within the transmitted data. The pointer could, for instance, indicate the number of octets in the data stream following a datum in the fixed frame after which the NPE will occur. It must also disclose what that particular NPE is.

In the case of FIG. 2 there are two NPE's. When the datum of the fixed frame occurs in the DATA field of the variable frame, the next predictable event is the occurrence of the stuffing indicator. When the datum occurs in the stuffing field then the NPE is the beginning of the next DATA field, assuming that the SI has disclosed the length of the current stuffing field. The NPE pointer must distinguish between these two NPE's for which the pointer will incorporate one additional bit.

A possible mechanism that would generate the pointer woule be a downward counter coupled to a two-state machine. When the variable frame is in DATA the state machine is in state '0', say, and when in the stuffing field in state '1'. As it enters state '0' the counter is set to a number equalling the (fixed) number of octets in the DATA field. With every octet sent off on the link the counter is decremented by one. Should the datum of the fixed frame occur while the machine is still in state '0' the number in the counter at its occurrence will be the pointer indicating the distance to the next stuffing indicator. As the state machine enters state '1' the counter is set to the number of the stuffing indicator and is similarly decremented with each stuffing octet sent off on the link. With occurrence of datum while in state '1' the counter value will again be the pointer, but not to the start of DATA.

At the receiving end interface received pointer values can be used to generate explicit indications of the marked events. This is conveniently implemented again by a down-counter. On receipt of the pointer the counter is set to the pointer value and decremented with each octet that is received in the data stream. When the count reaches zero, the event occurs and can be signalled by the interface to the equipment that is connected to it.

If the DATA fields were variable then the outlined technique would still be workable provided the DATA blocks would be preceded by a DATA length indicator. On entering state '0', the indicated length rather than a fixed number would be loaded into the counter, but otherwise everything would be as before.

Many modifications will be apparent those skilled in the art without departing from the spirit and scope of the invention.

We claim:

1. A method of transmitting digital signals (DI) in frames which include a stuffing field between nodes (N) in a network, each node having a buffer and a local clock for producing local clock signals (CLK2), said method including the steps of:

extracting clock signals (CLK1) from the digital signals (DI);

writing said digital signals (DI) into the buffer at the extracted clock signal (CLK1) rate;

reading said digital signals (DI) from the buffer at the local clock signal (CLK2) rate, including reading the content of the stuffing field in order to add or subtract stuffing bits therein in order to compensate for differences in frequencies between the local and extracted clock signals (CLK2, CLK1);

controlling said adding or subtracting of the stuffing bits so that the length of the stuffing field is within predetermined limits, wherein each of the frames includes a stuffing control field and addition or subtraction of the stuffing bits is controlled in accordance with an unconditional stuffing control code (F0, F1) in the stuffing control field, which indicates the length of the stuffing field;

monitoring frame markers (FMI, FMX) for frames upstream and downstream of the buffer, generating phase difference signals from said markers (FMI, FMX) and generating conditional stuffing control codes (C0, C1) in accordance with the variation between the phase difference signals and a desired phase difference value (D) between said frame markers (FMI, FMX); and generating the unconditional stuffing control codes (F0, F1) by comparing the potential length of the stuffing field if varied in accordance with said conditional stuffing control codes (C0, C1), and determining the value of said unconditional stuffing control codes (F0, F1) such that the length of the stuffing field (10) is not outside predetermined maximum and minimum lengths.

2. A method as claimed in claim 1 including the step of generating a new stuffing control code (NSC) indicative of the stuffing effected by said unconditional stuffing control codes (F0, F1) and writing said new stuffing control code (NSC) into the stuffing control field of the frame and transmitting the frame to downstream nodes.

3. Apparatus for transmitting digital signals (DI) in frames which include a stuffing field between nodes (N) in a network, said apparatus comprising:

means for extracting first clock signals (CLK1) from said digital signals (DI);

a local clock for generating second clock signals (CLK2);

a buffer into which said digital signals (DI) are written at the first clock rate, wherein said buffer comprises an elastic buffer;

reading means for reading said digital signals (DI) in said buffer including the content of the stuffing field;

stuffing means for adding or subtracting bits in the stuffing field of the frame read by said reading means to compensate for differences in frequencies between the first and second clock signals (CLK1, CLK2);

stuffing control means for controlling said stuffing means so that the length of each stuffing field is within predetermined limits, wherein each stuffing field includes an unconditional stuffing control code (F0, F1) which indicates the length of the stuffing field; and a phase measuring circuit which includes a storage means for storing a predetermined reference phase difference (D) between frame markers (FMI, FMX), said measuring circuit being operable to measure the phase difference between said frame markers (FMI, FMX) upstream and downstream of said elastic buffer and comparing the measured phase difference to said predetermined reference phase difference (D), and, in response thereto, generating conditional stuffing control codes (C0, C1) which are coupled to said stuffing control means.

4. Apparatus as claimed in claim 3 wherein the stuffing control means compares the potential length of the stuffing field if varied in accordance with said conditional stuffing control codes (C0, C1) and generating unconditional stuffing control codes (F0, F1) which are such that the actual length of the stuffing field is not outside predetermined maximum and minimum lengths.

5. Apparatus as claimed in claim 4 wherein the elastic buffer comprises a dual port RAM and write and read pointer circuits which are clocked by the first and second clock signals respectively (CLK1, CLK2).

6. Apparatus as claimed in claim 5 wherein the phase measuring circuit (26) includes a counter (48) which counts said second clock signals (CLK2).

7. A method of transmitting digital signals (DI) on a network having nodes (N) each having a buffer and a local clock for producing local clock signals (CLK2), said digital signals (DI) being in frames each of which includes a stuffing field and a stuffing control field, said method including the steps of:

extracting clock signals (CLK1) from the digital signals (DI) received at a node;

monitoring frame markers (FMI, FMX) in said frames upstream and downstream of said buffer;

generating phase difference signals from said frame markers (FMI, FMX);

generating conditional stuffing control codes (C0, C1) in accordance with the difference between the phase difference signals and a predetermined reference phase difference (D);

determining the potential length of the stuffing control field if varied in accordance with the conditional control codes (C0, C1) and, if the potential length stuffing control field is outside minimum and maximum lengths, generating unconditional stuffing control codes (F0, F1) such that the length of the stuffing field is not outside said minimum and maximum lengths;

adding or subtracting stuffing bits in said stuffing field in accordance with said unconditional stuffing control codes (F0, F1) in order to compensate for differences in frequencies between said local and extracted clock signals (CLK2, CLK1).

8. A method as claimed in claim 7 including the steps of writing said digital signals (DI) at the extracted clock rate (CLK1) and reading the digital signals (DI) from the buffer including the content of the stuffing field at the local clock rate (CLK2).

9. Apparatus for transmitting digital signals (DI) on a network having nodes (N), said digital signals (DI) being in frames each of which includes a stuffing field and stuffing control field, said apparatus including:

a buffer;

a local clock for producing local clock signals (CLK2);

means for extracting clock signals (CLK1) from the digital signals (DI) received at a node;

means for generating phase difference signals from frame markers (FMI, FMX) in said frames upstream and downstream of said buffer and for generating conditional stuffing control codes (C0, C1) in accordance with the difference between the phase difference signals and a predetermined reference phase difference (D);

stuffing control means for determining the potential length of the stuffing control field if varied in accordance with the conditional control codes (C0, C1) and, if the potential length stuffing control field is outside minimum and maximum lengths, generating unconditional stuffing control codes (F0, F1) such that the length of the stuffing field is not outside said minimum and maximum lengths; and stuffing means for adding or subtracting stuffing bits in said stuffing field in accordance with said unconditional stuffing control codes (F0, F1) in order to compensate for differences in frequencies between said local and extracted clock signals (CLK2, CLK1).

10. Apparatus as claimed in claim 9 wherein said buffer comprises an elastic buffer having a dual port RAM and a write pointer and a read pointer and wherein said write pointer writes said digital signals (DI) into said RAM at the extracted clock rate (CLK1) and the read pointer reads said digital signals (DI) including the content of the stuffing field at the local clock rate (CLK2).

11. Apparatus as claimed in claim 10 including a reset control circuit having said digital signals (DI) and said extracted clock (CLK1) coupled to inputs thereof said reset control circuit generating reset signals on an output thereof and being operable to pass said upstream frame markers (FMI) to said elastic buffer.

12. Apparatus according to claim 11 including a pipeline circuit which is clocked by the local clock (CLK2) and coupled to receive the digital signals from the elastic buffer and pass the digital signals to inputs of the stuffing control means, said pipeline circuit, in use, delaying transmission of said digital signals between the elastic buffer and the stuffing control means.

13. Apparatus as claimed in claim 12 wherein an output of the stuffing control means is coupled to pass said unconditional stuffing control codes (F0, F1) to said read pointer.

14. Apparatus as claim in claim 13 wherein said reset signals are coupled to said means for generating phase difference signals, said write pointer, and said stuffing control means.

15. Apparatus as claimed in claim 14 wherein said write pointer is reset by said reset signals.

16. Apparatus as claimed in claim 15 wherein the means for generating phase difference signals includes a phase register for storing said phase difference signals and a control ROM which stores said predetermined reference (D) and wherein said control ROM produces said conditional control codes (C0, C1) in accordance with the following table:

|           | C1 | C0 | Conditional Stuffing Action |
|-----------|----|----|------------------------------|
| Phase < D | L  | L  | +1                           |
| Phase = D | L  | L  | 0                            |
| Phase > D | H  | L  | −1                           | where:
+1 indicates increasing the length of the stuffing field by one octet;
−1 indicates decreasing the length of the stuffing field by one octet; and
D represents said predetermined reference.

17. Apparatus as claimed in claim 16 wherein the read pointer includes a read pointer ROM and a shift register coupled to receive at its input data output from the pointer ROM and to feedback its output to the pointer ROM, said shift register being clocked by said local clock (CLK2).

* * * * *